(12) United States Patent
Carbajal et al.

(10) Patent No.: US 8,015,617 B1
(45) Date of Patent: *Sep. 13, 2011

(54) BALLISTIC RESISTANT BODY ARMOR ARTICLES

(75) Inventors: Leopoldo Alejandro Carbajal, Newark, DE (US); Minshon J. Chiou, Chesterfield, VA (US); Patrick F. Fitzgerald, Colonial Heights, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 575 days.

This patent is subject to a terminal disclaimer.

(21) Appl. No.: 12/152,308

(22) Filed: May 14, 2008

(51) Int. Cl.
*F41H 1/02* (2006.01)
(52) U.S. Cl. .............. 2/2.5; 442/135; 428/105
(58) Field of Classification Search ...... 2/2.5; 89/36.02, 89/36.03, 36.04, 36.05; 428/102, 103, 104, 428/105, 113, 911, 902, 912; 442/134, 135, 442/64, 65, 366, 381, 389, 286, 394
See application file for complete search history.

(56) References Cited

U.S. PATENT DOCUMENTS

| 3,094,511 | A | 6/1963 | Hill et al. |
| 3,354,127 | A | 11/1967 | Hill et al. |
| 3,582,988 | A | 6/1971 | Armellino |
| 3,673,143 | A | 6/1972 | Bair et al. |
| 3,767,756 | A | 10/1973 | Blades |
| 3,819,587 | A | 6/1974 | Kwoleck |
| 3,869,429 | A | 3/1975 | Blades |
| 3,869,430 | A | 3/1975 | Blades |
| 3,971,072 | A | 7/1976 | Armellino |
| 4,172,938 | A | 10/1979 | Mera et al. |
| 4,181,768 | A | 1/1980 | Severin |
| 4,228,118 | A | 10/1980 | Wu et al. |
| 4,276,348 | A | 6/1981 | Wu et al. |
| 4,457,985 | A | 7/1984 | Harpell et al. |
| 4,478,083 | A | 10/1984 | Hassler et al. |
| 4,533,693 | A | 8/1985 | Wolfe et al. |
| 4,703,103 | A | 10/1987 | Wolfe et al. |
| 4,772,678 | A | 9/1988 | Sybert et al. |
| 4,847,350 | A | 7/1989 | Harris |
| 5,061,545 | A | 10/1991 | Li et al. |

(Continued)

FOREIGN PATENT DOCUMENTS

DE 3743243 6/1989

(Continued)

OTHER PUBLICATIONS

W. Black and J. Preston; Fiber-Forming Aromatic Polyamides; Man-Made Fibres—Science and Technology, vol. 2, p. 297; Interscience Publishers, 1968.

(Continued)

*Primary Examiner* — Arti Singh-Pandey

(57) ABSTRACT

The present invention relates to body armor articles for resisting ballistic objects. The articles comprise woven fabric layers and sheet layers. The woven fabric layers are made from yarns having a tenacity of at least 7.3 grams per dtex and a modulus of at least 100 grams per dtex. The sheet layers comprise non-woven random oriented fibrous sheets and/or non fibrous films. The woven fabric layers and the sheet layers are stacked together comprising a first core section which includes at least two repeating units of, in order, at least one of the woven fabric layers then at least one of the sheet layers. The sheet layers comprise 0.5 to 30 wt % of the total weight of the article.

16 Claims, 6 Drawing Sheets

U.S. PATENT DOCUMENTS

| | | | |
|---|---|---|---|
| 5,089,591 A | 2/1992 | Gregory et al. | |
| 5,160,776 A | 11/1992 | Li et al. | |
| 5,276,128 A | 1/1994 | Rosenberg et al. | |
| 5,395,671 A * | 3/1995 | Coppage et al. | 428/102 |
| 5,674,969 A | 10/1997 | Sikkema et al. | |
| 5,677,029 A | 10/1997 | Prevorsek et al. | |
| 6,151,710 A | 11/2000 | Bachner, Jr. | |
| 6,238,768 B1 | 5/2001 | Van de Goot | |
| 6,825,137 B2 | 11/2004 | Fu et al. | |
| 6,990,866 B2 | 1/2006 | Kibblewhite | |
| 2002/0037391 A1 | 3/2002 | Harpell et al. | |
| 2003/0139108 A1 | 7/2003 | Klintworth et al. | |
| 2004/0132368 A1 | 7/2004 | Price et al. | |
| 2004/0144244 A1 | 7/2004 | Sargent | |
| 2007/0117483 A1 | 5/2007 | Bhatnagar et al. | |
| 2008/0075933 A1 * | 3/2008 | Rovers | 428/196 |

FOREIGN PATENT DOCUMENTS

| | | |
|---|---|---|
| WO | WO 99/61862 | 12/1999 |
| WO | WO 2007/003334 A1 | 1/2007 |
| WO | WO 2007/058679 A2 | 5/2007 |
| WO | WO 2007/067949 A2 | 6/2007 |
| WO | WO 2007/145673 | 12/2007 |
| WO | WO 2008/085395 | 7/2008 |

OTHER PUBLICATIONS

PCT International Search Report and Written Opinion for Internationa Application No. PCT/US2009/043916 dated Jan. 6, 2010.

* cited by examiner

BALLISTIC RESISTANT BODY ARMOR ARTICLES

BACKGROUND OF THE INVENTION

1. Field of the Invention

This invention relates to ballistic resistant body armor.

2. Description of Related Art

Many designs for body armor for resisting ballistic threats have been proposed and many commercialized. Designs are made to increase comfort by the wearer to increase their use. Comfort is generally increased by making them lighter and more flexible to allow freedom of motion by the wearer. However, apparel weight needs to be increased to provide protection against projectiles with greater velocities and mass. It is also desirable to minimize the costs to make the apparel, but traditional materials used in body armor are relatively expensive.

Standards have been proposed and adopted throughout the world to ensure minimum capabilities of body armor for resisting ballistic objects. See NIJ Standard—0101.04 "Ballistic Resistance of Personal Body Armor", issued in September 2000. It defines capabilities for body armor for level IIA, II, IIIA and III protection. To achieve level II protection, the armor must have no penetration and no more than a backface deformation of 44 mm by a projectile such as a .357 magnum projectile at a velocity ($V_o$) defined as 1430 ft/sec plus or minus (+/−) 30 feet per sec (436 m/sec +/−9 m/sec). To achieve level IIIA protection, the armor must have no penetration and no more than a backface deformation of 44 mm by a projectile such as a .44 magnum projectile at a velocity ($V_o$) defined as 1430 ft/sec plus or minus (+/−) 30 feet per sec (436 m/sec +/−9 m/sec). Body armor is frequently designed with a margin of safety surpassing the requirements of the Standard. However, increasing the margin of safety typically increases the cost and weight and decreases the flexibility of the body armor. So body armor is typically made to meet published standards with a small margin of safety, but much more.

There are also many designs for body armor for resisting spike (e.g., ice pick like) or knife stabbing or slashing threats. However, such designs typically are not optimum or even necessarily able to protect against ballistic threats. Separate standards have been published providing different tests and requirements for such spike or knife resistant body armor compared to standards for ballistic resistant body armor. Thus, those skilled in the art do not assume teachings on making or optimizing spike or knife resistant body armor are useful in designing ballistic resistant body armor.

Body armor meeting the NIJ ballistic standard level II or IIIA protection can be made solely of woven fabric layers made from high tenacity multifilament yarns, such as made from para-aramid. Such woven fabric layers provide very good penetration resistance against bullets and fragments. However, woven fabric layers alone provide less protection against backface deformation requiring more layers and increased weight to meet the margin of safety or even the standard. Hybrid body armor meeting the level II or IIIA protection can be made using a plurality of such woven fabric layers stacked in combination with a plurality of unidirectional assemblies comprising a unidirectional tape made of an array of parallel high tenacity multifilament yarns in a matrix resin stacked with adjacent tapes with their yarns at angles inclined with respect to adjacent tapes. Typically the yarns in the tapes are at right angles with respect to yarns in adjacent tapes. These hybrid body armors provide good penetration resistance against bullets, greater protection against backface deformation, but replacing woven fabric layers with unidirectional assemblies reduces protection against fragments, increases rigidity and increases cost. Body armor meeting the level II or IIIA protection can be made solely using a plurality of the unidirectional assemblies. They provide good penetration resistance against bullets, very good protection against backface deformation, but they typically provide the least protection against fragments, are more rigid than the other options, and are the most expensive.

It is an object of this invention to provide improved body armor designs that utilize the advantages of woven fabric layers described above without incorporating unidirectional assemblies and their associated disadvantages.

These and other objects of the invention will be clear from the following description.

BRIEF SUMMARY OF THE INVENTION

The invention relates to body armor articles for resisting ballistic objects, comprising:

a plurality of woven fabric layers woven from yarns having a tenacity of at least 7.3 grams per dtex and a modulus of at least 100 grams per dtex;

a plurality of sheet layers comprising non-woven random oriented fibrous sheets and/or non fibrous films, each of the sheet layers having a thickness of at least 0.013 mm (0.5 mils);

the woven fabric layers and the sheet layers stacked together comprising a first core section which includes at least two repeating units of, in order, at least one of the woven fabric layers then at least one of the sheet layers; and the sheet layers comprising 0.5 to 30 wt % of the total weight of the article.

BRIEF DESCRIPTION OF THE DRAWING(S)

The invention can be more fully understood from the following detailed description thereof in connection with accompanying drawings described as follows.

DETAILED DESCRIPTION OF THE INVENTION

Figure 1:
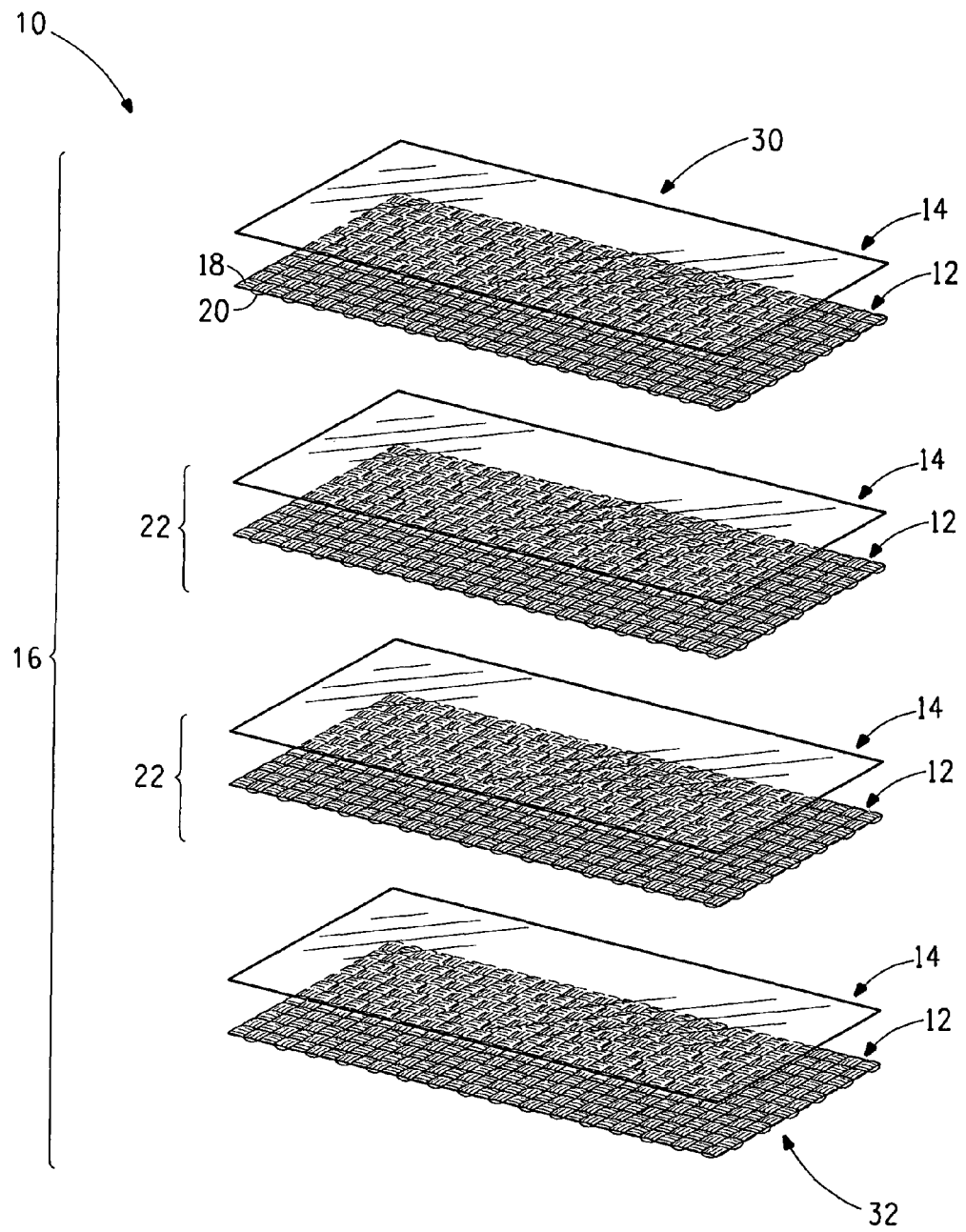
FIG. 1 is an exploded perspective view of a first embodiment of a ballistic penetration resistant article with a woven fabric layer on one end and a sheet layer on the other end in accordance with the present invention.

The present invention may be understood more readily by reference to the following detailed description of illustrative and preferred embodiments that form a part of this disclosure. It is to be understood that the scope of the claims is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. When a range of values is expressed, another embodiment includes from the one particular value and/or to the other particular value. Similarly, when values are expressed as approximations, by use of the antecedent "about," it will be understood that the particular value forms another embodiment. All descriptions, limitations and ranges are inclusive and combinable. Further, throughout the following detailed description, similar reference characters refer to similar elements in all figures of the drawings.

Referring to FIG. 1 which shows an exploded perspective view of one embodiment of the present invention, the invention is directed to a body armor article 10 for resisting ballistic objects. The body armor article 10 is for incorporation into body armor and comprises a plurality of woven fabric layers 12 and a plurality of sheet layers 14 stacked together to comprise a first core section 16. The first core section 16 includes at least two repeating units 22 of, in order, at least one of the woven fabric layers 12 then at least one of the sheet layers 14. The sheet layers 14 comprise 0.5 to 30 wt % of the total weight of the article.

The Woven Fabric Layers

The fabric layers 12 are woven. The term "woven" is meant herein to be any fabric that can be made by weaving; that is, by interlacing or interweaving at least two yarns 18, 20 typically at right angles. Generally such fabrics are made by interlacing one set of yarns 18, called warp yarns, with another set of yarns 20, called weft or fill yarns. The woven fabric can have essentially any weave, such as, plain weave, crowfoot weave, basket weave, satin weave, twill weave, unbalanced weaves, and the like. Plain weave is the most common and is preferred.

In some embodiments, each woven fabric layer 12 has a basis weight of from 50 to 800 g/m². In some preferred embodiments the basis weight of each woven layer is from 100 to 600 g/m². In some most preferred embodiments the basis weight of a woven layer is from 130 to 500 g/m².

In some embodiments, the fabric yarn count is 5 to 100 ends per inch (2 to 39 ends per centimeter) in the warp, preferably 8 to 60 ends/inch (3 to 24 ends per centimeter). In some most preferred embodiments the yarn count is 10 to 45 ends/inch (4 to 18 ends per centimeter) in the warp. In some embodiments, the fabric yarn count in the weft or fill is 5 to 100 ends per inch (2 to 39 ends per centimeter), preferably 8 to 60 ends/inch (3 to 24 ends per centimeter). In some most preferred embodiments the yarn count in the weft or fill is 10 to 45 ends/inch (4 to 18 ends per centimeter).

The woven fabric layers 12 are preferably not encased or coated with a matrix resin. In other words, they are matrix resin free. By "matrix resin" is meant an essentially homogeneous resin or polymer material in which the yarn is embedded.

Yarns and Filaments

The fabric layers 12 are woven from multifilament yarns having a plurality of filaments. The yarns can be intertwined and/or twisted. For purposes herein, the term "filament" is defined as a relatively flexible, macroscopically homogeneous body having a high ratio of length to width across its cross-sectional area perpendicular to its length. The filament cross section can be any shape, but is typically circular or bean shaped. Herein, the term "fiber" is used interchangeably with the term "filament", and the term "end" is used interchangeably with the term "yarn".

The filaments can be any length. Preferably the filaments are continuous. Multifilament yarn spun onto a bobbin in a package contains a plurality of continuous filaments. The multifilament yarn can be cut into staple fibers and made into a spun staple yarn suitable for use in the present invention. The staple fiber can have a length of about 1.5 to about 5 inches (about 3.8 cm to about 12.7 cm). The staple fiber can be straight (i.e., non crimped) or crimped to have a saw tooth shaped crimp along its length, with a crimp (or repeating bend) frequency of about 3.5 to about 18 crimps per inch (about 1.4 to about 7.1 crimps per cm).

The yarns have a yarn tenacity of at least 7.3 grams per dtex and a modulus of at least 100 grams per dtex. Preferably, the yarns have a linear density of 50 to 4500 dtex, a tenacity of 10 to 65 g/dtex, a modulus of 150 to 2700 g/dtex, and an elongation to break of 1 to 8 percent. More preferably, the yarns have a linear density of 100 to 3500 dtex, a tenacity of 15 to 50 g/dtex, a modulus of 200 to 2200 g/dtex, and an elongation to break of 1.5 to 5 percent.

Fabric Layer Fiber Polymer

The yarns of the present invention may be made with filaments made from any polymer that produces a high-strength fiber, including, for example, polyamides, polyolefins, polyazoles, and mixtures of these.

When the polymer is polyamide, aramid is preferred. The term "aramid" means a polyamide wherein at least 85% of the amide (—CONH—) linkages are attached directly to two aromatic rings. Suitable aramid fibers are described in Man-Made Fibres—Science and Technology, Volume 2, Section titled Fibre-Forming Aromatic Polyamides, page 297, W. Black et al., Interscience Publishers, 1968. Aramid fibers and their production are, also, disclosed in U.S. Pat. Nos. 3,767,756; 4,172,938; 3,869,429; 3,869,430; 3,819,587; 3,673,143; 3,354,127; and 3,094,511.

The preferred aramid is a para-aramid. The preferred para-aramid is poly(p-phenylene terephthalamide) which is called PPD-T. By PPD-T is meant the homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. As a general rule, other diamines and other diacid chlorides can be used in amounts up to as much as about 10 mole percent of the p-phenylene diamine or the terephthaloyl chloride, or perhaps slightly higher, provided only that the other diamines and diacid chlorides have no reactive groups which interfere with the polymerization reaction. PPD-T, also, means copolymers resulting from incorporation of other aromatic diamines and other aromatic diacid chlorides such as, for example, 2,6-naphthaloyl chloride or chloro- or dichloroterephthaloyl chloride or 3,4'-diaminodiphenylether.

Additives can be used with the aramid and it has been found that up to as much as 10 percent or more, by weight, of other polymeric material can be blended with the aramid. Copolymers can be used having as much as 10 percent or more of other diamine substituted for the diamine of the aramid or as much as 10 percent or more of other diacid chloride substituted for the diacid chloride or the aramid.

When the polymer is polyolefin, polyethylene or polypropylene is preferred. The term "polyethylene" means a predominantly linear polyethylene material of preferably more than one million molecular weight that may contain minor amounts of chain branching or comonomers not exceeding 5 modifying units per 100 main chain carbon atoms, and that may also contain admixed therewith not more than about 50 weight percent of one or more polymeric additives such as alkene-1-polymers, in particular low density polyethylene, propylene, and the like, or low molecular weight additives such as anti-oxidants, lubricants, ultra-violet screening agents, colorants and the like which are commonly incorporated. Such is commonly known as extended chain polyethylene (ECPE) or ultra high molecular weight polyethylene (UHMWPE). Preparation of polyethylene fibers is discussed in U.S. Pat. Nos. 4,478,083, 4,228,118, 4,276,348 and Japanese Patents 60-047,922, 64-008,732. High molecular weight linear polyolefin fibers are commercially available. Preparation of polyolefin fibers is discussed in U.S. Pat. No. 4,457,985.

In some preferred embodiments polyazoles are polyarenazoles such as polybenzazoles and polypyridazoles. Suitable polyazoles include homopolymers and, also, copolymers. Additives can be used with the polyazoles and up to as much as 10 percent, by weight, of other polymeric material can be blended with the polyazoles. Also copolymers can be used having as much as 10 percent or more of other monomer substituted for a monomer of the polyazoles. Suitable polyazole homopolymers and copolymers can be made by known procedures, such as those described in or derived from U.S. Pat. Nos. 4,533,693 (to Wolfe, et al., on Aug. 6, 1985), 4,703,103 (to Wolfe, et al., on Oct. 27, 1987), 5,089,591 (to Gregory, et al., on Feb. 18, 1992), 4,772,678 (Sybert, et al., on Sep. 20, 1988), 4,847,350 (to Harris, et al., on Aug. 11, 1992), and 5,276,128 (to Rosenberg, et al., on Jan. 4, 1994).

Preferred polybenzazoles are polybenzimidazoles, polybenzothiazoles, and polybenzoxazoles and more preferably such polymers that can form fibers having yarn tenacities of 30 gpd or greater. If the polybenzazole is a polybenzothiazole, preferably it is poly(p-phenylene benzobisthiazole). If the polybenzazole is a polybenzoxazole, preferably it is a it is poly(p-phenylene benzobisoxazole) and more preferably the poly(p-phenylene-2,6-benzobisoxazole) called PBO.

Preferred polypyridazoles are polypyridimidazoles, polypyridothiazoles, and polypyridoxazoles and more preferably such polymers that can form fibers having yarn tenacities of 30 gpd or greater. In some embodiments, the preferred polypyridazole is a polypyridobisazole. The preferred poly(pyridobisoxazole) is poly(1,4-(2,5-dihydroxy)phenylene-2,6-pyrido[2,3-d:5,6-d']bisimidazole which is called PIPD. Suitable polypyridazoles, including polypyridobisazoles, can be made by known procedures, such as those described in U.S. Pat. No. 5,674,969.

Sheet Layers

The sheet layers 14 comprise non-woven random oriented fibrous sheets and/or non fibrous films.

By "non-woven random oriented fibrous sheet" is meant a unitary network or arrangement of fibers that are not "woven" together. The non-woven random oriented fibrous sheets are made of random oriented fibers. Suitable examples of non-woven random oriented fibrous sheets include spun bonded fibrous webs, felt, fiber batts, and the like. The fibers in the non-woven random oriented fibrous sheets can be made from any polymer that produces a fiber that can be laid down in a randon fashion in sheet form including, for example, polyamides, polyolefins, polyazoles, and mixtures of these. Spun bonded fibrous webs can be formed by filaments that have been extruded, drawn, and then laid on a continuous belt. Bonding can be accomplished by several methods such as by hot roll calendering or by passing the web through a saturated stream chamber at en elevated pressure. Preferably, the non-woven random oriented fibrous sheets are spun bonded fibrous webs. A preferred spun bonded fibrous web is Tyvek® brand high density polyethylene sheets made by E. I. du Pont de Nemours and Company with offices in Wilmington, Del., U.S.A.

By "non fibrous film" is meant a continuous flexible polymeric film or sheet produced by methods such as extrusion, coextrusion and casting that is free of fibrous filaments. The non fibrous film may be made of polycondensation products of dicarboxylic acids with dihydroxyalcohols such as polyester, ionomers, thermoplastic fluoropolymers, polyolefins, polyimides and mixtures thereof. Suitable polyesters include saturated polyesters such as polyethylene terephthalate, polycarbonate and polybutyrate. One useful polyethylene terephthalate is available under the tradename Mylar®. A suitable ionomer is ethylene methacrylic acid copolymer; one suitable ionomer is available under the tradename Surlyn®. Examples of fluoroploymers include polyvinyl fluoride, poly(tetrafluoroethylene), polyvinyl chloride and polyvinylidene fluoride. A suitable polyvinyl fluoride material is available under the tradename Tedlar®. Suitable polyolefins include polyethylene and polypropylene. Suitable polyimides are aromatic heterocyclic polyimides and linear polyimides such as those available under the tradenames Kapton®, Apical® and Kaptrex®.

Each of the sheet layers 14 have a thickness of at least 0.013 mm (0.5 mils). Preferably, each of the sheet layers 14 has a thickness of no more than 0.152 mm (6 mils). More preferably, each of the sheet layers 14 has a thickness of 0.015 to 0.142 mm.

Preferably, the sheet layers 14 are made of materials with an average acoustic velocity of at least 600 m/sec, more preferably at least 700 m/sec and even more preferably at least 1500 m/sec.

Each of the sheet layers 14 has a ratio of maximum strain to failure value to minimum strain to failure value of 1 to 5, preferably 1 to 3, when tested in accordance with ASTM method D882. In other words, the sheet layers 14 are isotropic or substantially isotropic.

The sheet layers 14 comprise 0.5 to 30 wt %, more preferably 3 to 28 wt %, and even more preferably 5 to 26 wt %, of the total weight of the article 10, 26, 40, 48.

Core Section

The woven fabric layers 12 and the sheet layers 14 stacked together comprise the first core section 16. The first core section 16 preferably includes 3 to 60 of the woven fabric layers 12 and 3 to 60 of the sheet layers 14. More preferably, it includes 8 to 50 of the woven fabric layers 12 and 5 to 50 of the sheet layers 14. Even more preferably, it includes 10 to 45 of the woven fabric layers 12 and 8 to 45 of the sheet layers 14.

Figure 2:
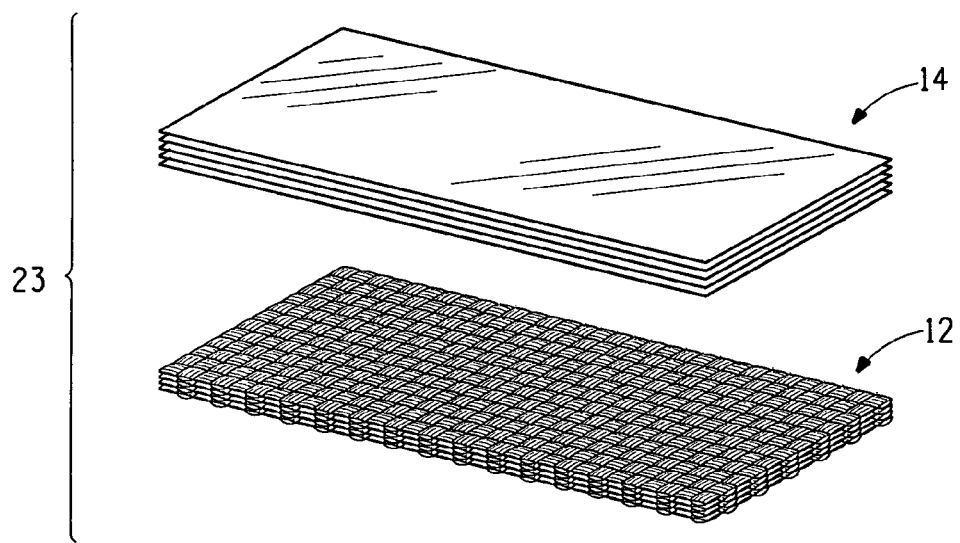
FIG. 2 is an exploded perspective view of a repeating section having, in order, a plurality of fabric layers and a plurality of sheet layers in accordance with the present invention.

Preferably, the core section 16 includes at least two repeating units 22 of, in order, at least one of the woven fabric layers 12 then at least one of the sheet layers 14. The repeating unit 22 may optionally comprise, in order, only one of the woven fabric layers 12 and at least two of the sheet layers 14. The repeating unit 22 may alternatively or in addition include, in order, at least two of the woven fabric layers 12 and only one of the sheet layers 14. FIG. 2 shows an embodiment of the repeating unit 23 with a plurality of the woven fabric layers stacked adjacent to a plurality of the sheet layers. Preferably, there are 3 to 50, more preferably 5 to 40, even more preferably 8 to 35, of the repeating units 22, 23.

Figure 3:
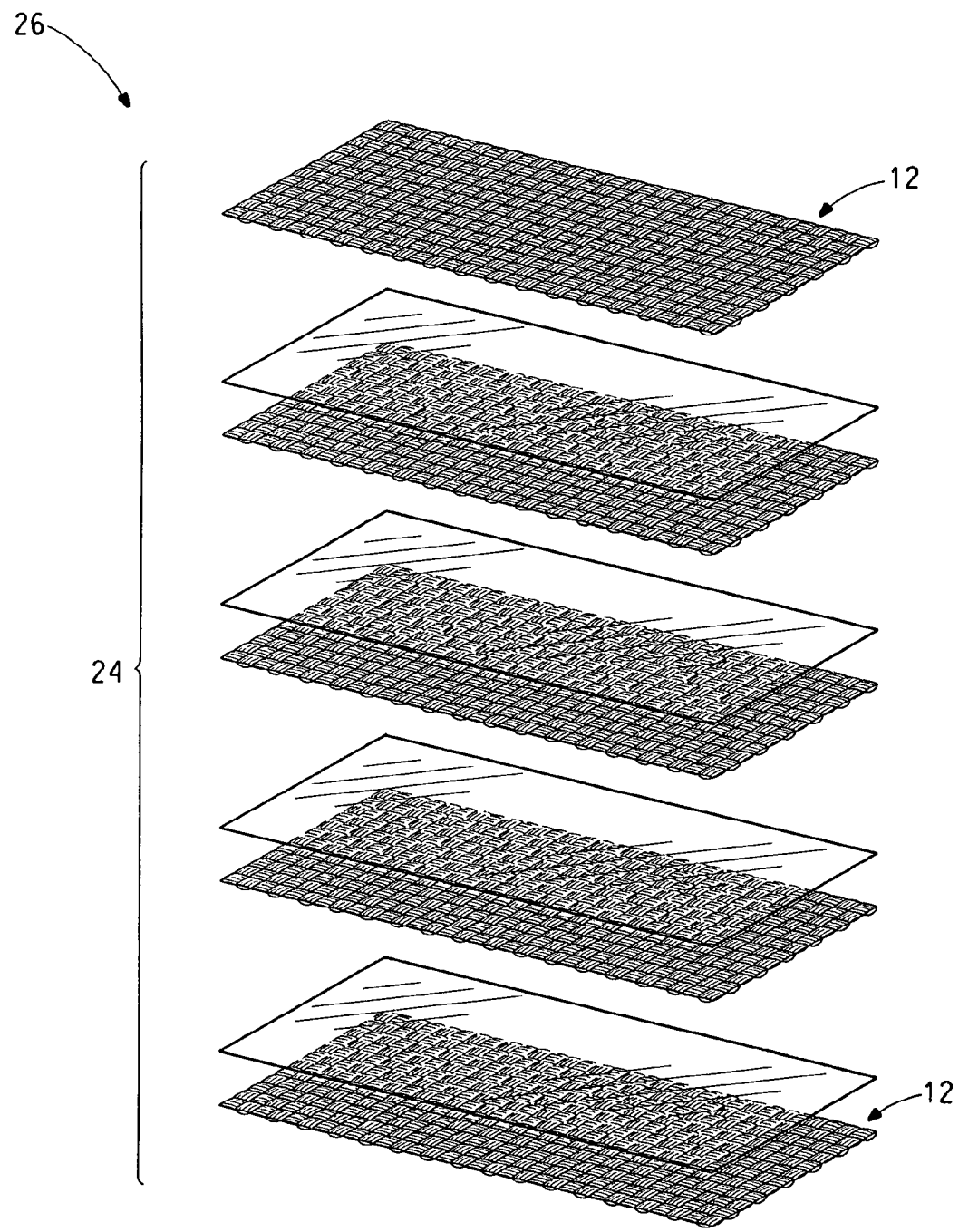
FIG. 3 is an exploded perspective view of a second embodiment of a ballistic penetration resistant article with a woven fabric layer on each end in accordance with the present invention.

As shown in FIG. 1, the core section 16 can have a woven fabric layer 12 at one end and a sheet layer at the other distal end. Alternatively, as shown in FIG. 3, the core section 24 can have a woven fabric layer 12 at each end.

Figure 4:
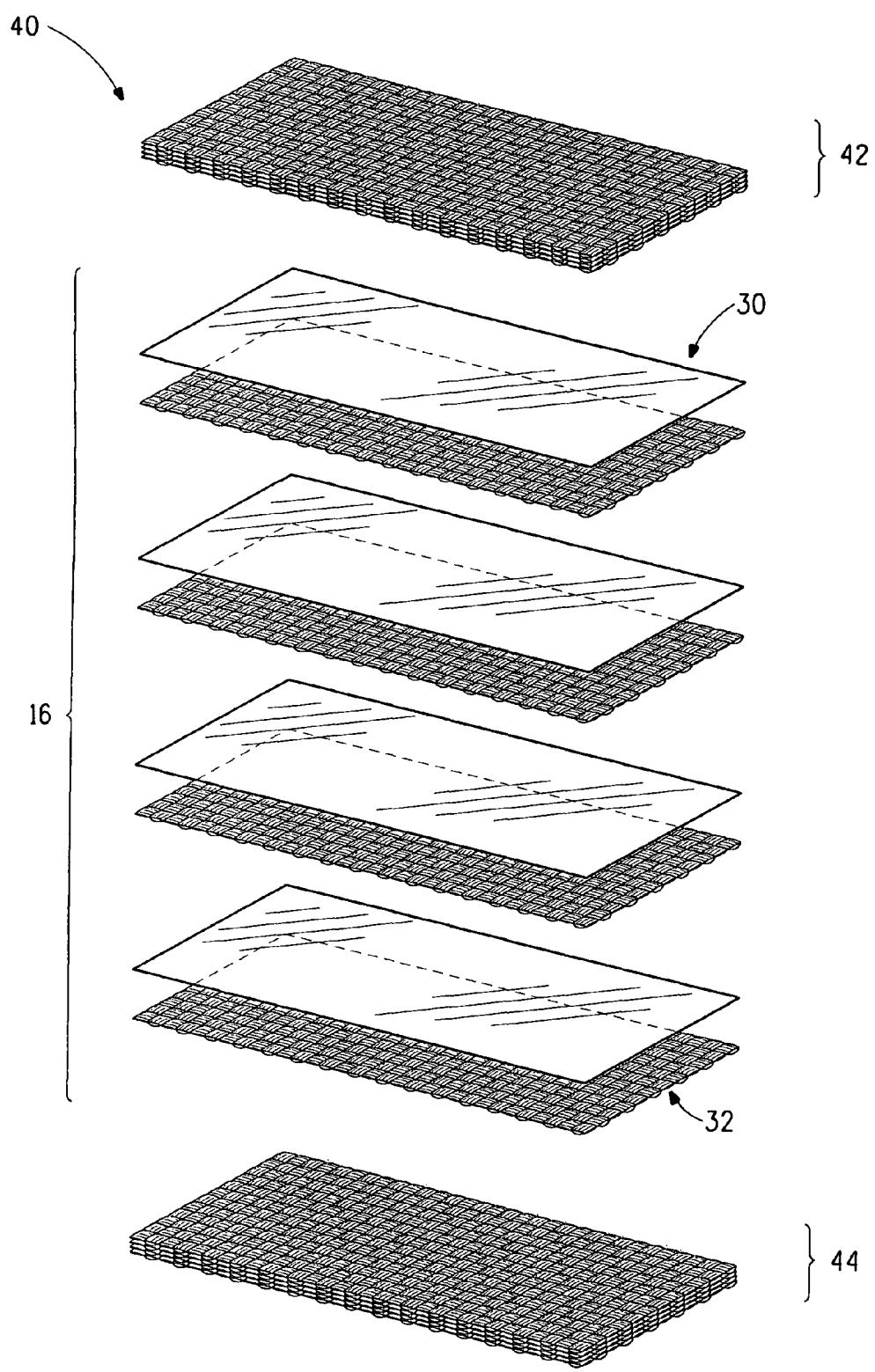
FIG. 4 is an exploded perspective view of a third embodiment of a ballistic penetration resistant article comprising, in order, a first strike section, a repeating section, and a body facing section in accordance with the present invention.

Referring again to FIG. 1, the core section 16 has a first strike end surface 30 and a second body facing end surface 32. Referring to FIG. 4, the article 40 can optionally further comprise a first strike section 42 and a body facing section 44. The first strike section 42 can comprise a plurality of the woven fabric layers 12 stacked together and stacked on the first strike end surface 30 of the core section 16. The body facing section 44 can comprise a plurality of the woven fabric layers 12 stacked together and stacked on the body facing surface 32 of the core section 16.

The first strike section 42 can have 2 to 30 woven fabric layers stacked together and the body facing section 44 can have 2 to 30 woven fabric layers stacked together. If desired the woven fabric layers 12 of the first strike section 42 and the body facing section 44 can be the same or different.

Figure 5:
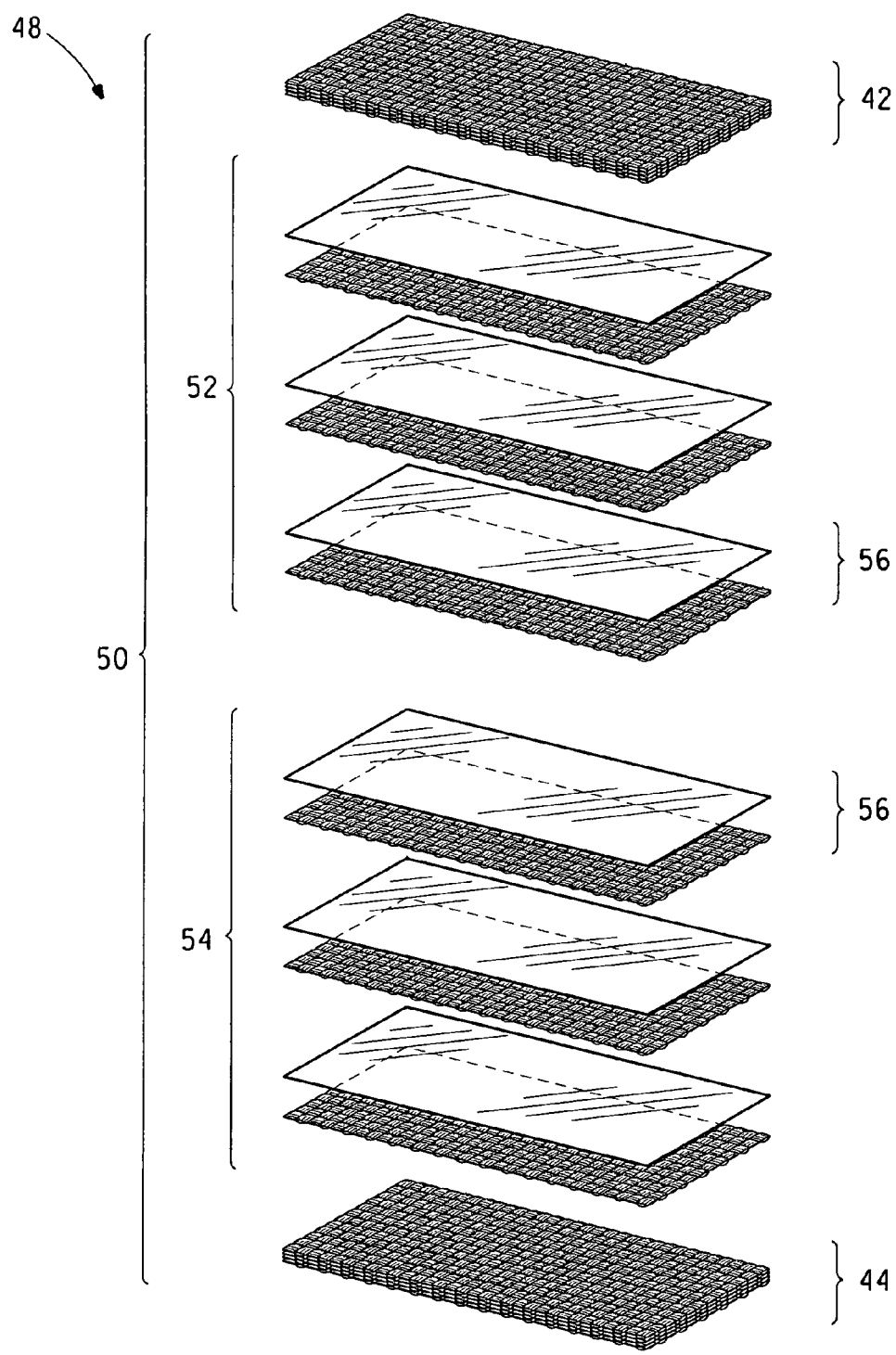
FIG. 5 is a an exploded perspective view of a fourth embodiment of a ballistic penetration article comprising, in order, a first strike section, a first repeating section, a second repeating section, and a body section in accordance with the present invention.

Referring to FIG. 5, the core section 50 can comprises a plurality of core subsections 52, 54, each core subsection 52, 54 with a repeating unit 56.

Body Armor Article

Preferably, the article 10, 26, 40, 48 has a backface deformation of less than or equal to 44 mm at a projectile velocity ($V_o$) of 1430 ft/sec plus or minus (+/−) 30 ft/sec (436 m/sec +/−9 m/sec) in accordance with NIJ Standard—0101.04 "Ballistic Resistance of Personal Body Armor", issued in September 2000.

Figure 6:
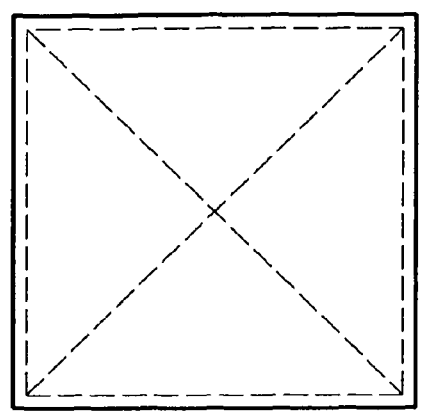
FIG. 6 shows a first manner for attaching layers together.
Figure 7:
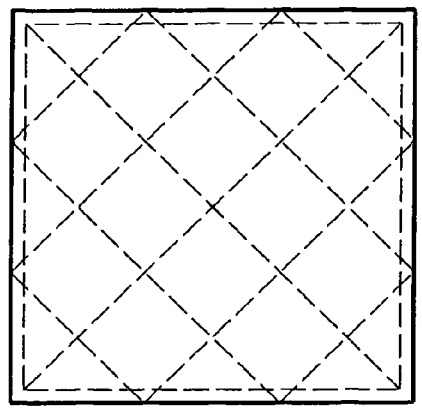
FIG. 7 shows a second manner for attaching layers together.
Figure 8:
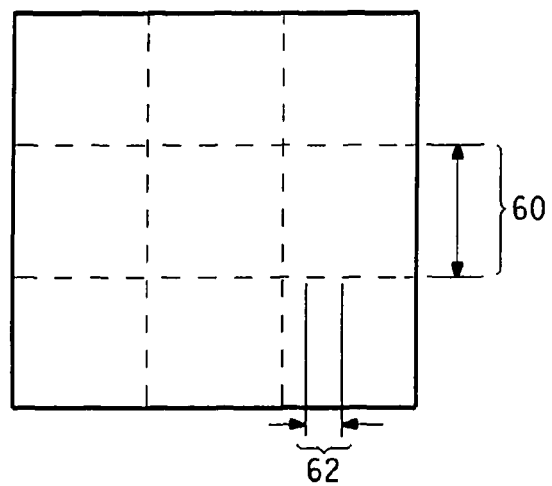
FIG. 8 shows a third manner for attaching layers together.

Preferably, the woven fabric layers 12 and the sheet layers 14 are only attached together at 10% or less of their surface areas allowing all or most of the remainder of the layers to move laterally and/or separate with respect to adjacent layers. The layers can be attached by stitches or adhesive or melt bonding, at edges and/or in the pattern of a cross (X), both as shown in FIG. 6, or in a pattern of squares typically done on a quilt, as shown in FIGS. 7 and 8. The stitch pattern illustrated in FIG. 7 is referred to as a quilted stitch pattern with additional edge stitching. More preferably, they are attached by less than 5%, and even more preferably less than 3%, of the surface area of the layers. Further, referring to FIG. 8, when the stitch pattern is in squares, preferably, the stitch spacing 60 is from about 48 to about 54 mm and more preferably from about 50 to about 52 mm. "Stitch spacing" is defined as the distance 60 between adjacent parallel stitches in a stitch pattern of squares on the face of layers. Also preferably the stitch length 62 is from about 3 to about 7 mm and more preferably from about 4 to about 6 mm. "Stitch length" is defined as the shortest repeating length 62 of stitching yarn that transverses the face of the layer.

Preferably, the article 10, 26, 40, 48 does not include any unidirectional tape or unidirectional assembly. By "unidirectional tape" is meant an array of generally parallel high tenacity multifilament yarns generally in a plane in a matrix resin. By "unidirectional assembly" is meant a plurality of the unidirectional tapes stacked with adjacent tapes with their yarns at angles inclined with respect to adjacent tapes. Typically the yarns in the tapes are at right angles with respect to yarns in adjacent tapes. Unidirectional tapes and assemblies are disclosed in U.S. Pat. No. 5,160,776 to Li et al.

Preferably, the woven fabric layers 12 and the sheet layers 14, stacked together, have an areal density of 2.5 to 5.7 kg/m$^2$, and more preferably 3.0 to 5.2 kg/m$^2$.

INDUSTRIAL APPLICABILITY

The articles include protective apparel or body armor that protect body parts, such as vests, jackets, etc. from projectiles. The term "projectile" is used herein to mean a bullet or other object or fragment thereof, such as, fired from a gun.

Test Methods

The following test methods were used in the following Examples.

Temperature: All temperatures are measured in degrees Celsius (° C.).

Linear Density The linear density of a yarn or fiber is determined by weighing a known length of the yarn or fiber based on the procedures described in ASTM D1907-97 and D885-98. Decitex or "dtex" is defined as the weight, in grams, of 10,000 meters of the yarn or fiber. Denier (d) is 9/10 times the decitex (dtex).

Tensile Properties: The fibers to be tested were conditioned and then tensile tested based on the procedures described in ASTM D885-98. Tenacity (breaking tenacity), modulus of elasticity and elongation to break are determined by breaking test fibers on an Instron tester.

Areal Density: The areal density of the fabric layer is determined by measuring the weight of each single layer of selected size, e.g., 10 cm×10 cm. The areal density of a composite structure is determined by the sum of the areal densities of the individual layers.

Average Acoustic Velocity: The acoustic velocity is the speed at which the tensile stress wave is transmitted through a material and was measured according to ASTM E494 in various directions and an average acoustic velocity was calculated. It is reported in m/sec. The reported average acoustic velocity is the average value of acoustic velocities that are measured traveling radially from a point of impact in the sheet layer set at (0,0) at 0°, 45°, 90°, 135°, 180°, −45°, −90°, −135° with respect to the positive x axis, with the machine or roll direction positioned along the x axis and the cross or transverse direction positioned along the y axis.

Ballistic Penetration and Backface Deformation Performance: Ballistic tests of the multi-layer panels are conducted in accordance with NIJ Standard—0101.04 "Ballistic Resistance of Personal Body Armor", issued in September 2000. The reported V50 values are average values for the number of shots fired for each example. Either two or four shots were fired per example.

EXAMPLES

The following examples are given to illustrate the invention and should not be interpreted as limiting it in any way. All parts and percentages are by weight unless otherwise indicated. Examples prepared according to the process or processes of the current invention are indicated by numerical values. Control or Comparative Examples are indicated by letters. Data and test results relating to the Comparative and Inventive Examples are shown in Tables 1 and 2.

Description of Layers

Layers of the following high tenacity fiber fabrics and sheet structures were prepared and made into various composite assemblies for ballistic test as follows.

Fabric layer "F1" was a plain weave woven fabric of 840 denier (930 dtex) poly(p-pheynlene terephthalamide) (or PA) yarn available from E. I. du Pont de Nemours and Company under the trade name of Kevlar® para-aramid brand 129 yarn and was woven at 26×26 ends per inch (10.2×10.2 ends per centimeter).

Fabric layer "F2" was a plain weave woven fabric of 600 denier (660 dtex) poly(p-pheynlene terephthalamide) (or PA) yarn available from E. I. du Pont de Nemours and Company under the trade name of Kevlar® para-aramid brand X300 yarn and was woven at 23×23 ends per inch (9.1×9.1 ends per centimeter).

Fabric layer "F3" was a plain weave woven fabric of 500 denier (550 dtex) poly(p-phenylene-2,6-benzobisoxazole) (or PBO) yarn available from Toyobo Co. under the trade name of Zylon® brand PBO yarn and was woven at 30×30 ends per inch (11.8×11.8 ends per centimeter).

Fabric layer "F4" was a plain weave woven fabric of 215 denier (239 dtex) ultra high molecular weight polyethylene (or UHMWPE) yarn available from Honeywell International, Inc., under the trade name of Spectra® and was woven at 55×55 ends per inch (21.7×21.7 ends per centimeter).

Fabric layer "F5" was a unidirectional assembly of four unidirectional tapes or single layer sheets of aramid yarn with each sheet crossplied at 0°/90°/0°/90° and sandwiched between thermoplastic films. The total areal weight of the assembly was 234 grams per square meter. Such assemblies are available from Honeywell International, Inc., under the trade name of Gold Flex®.

Fabric layer "F6" was a unidirectional assembly of two unidirectional tapes or single layer sheets of polyethylene yarn with each sheet crossplied at 0°/90 and sandwiched between thermoplastic films that had also been impregnated into the yarns. The total areal weight of the assembly was 134 grams per square meter. Such assemblies are available from DSM, Geleen, Holland under the trade name of Dyneema®SB31.

Sheet layer "S1" was a polyethylene terephthalate (or PET) polyester film or sheet structure available from DuPont Teijin Films™ under the trade name of Mylar® P25 with an average acoustic velocity of 2045 m/s, a thickness of 0.74 mil (0.019 mm), and a ratio of maximum to minimum elongation at break for any two given directions of 1.71.

Sheet layer "S2" was a polyethylene terephthalate (or PET) polyester film or sheet structure available from DuPont Teijin Films™ under the trade name of Mylar® C with an average acoustic velocity of 1770 m/s, a thickness of 0.16 mil (0.004 mm), and a ratio of maximum to minimum elongation at break for any two given directions of 1.42.

Sheet layer "S3" was an ionomeric ethylene methacrylic acid. (or E/MAA) copolymer film or sheet structure available from E. I. du Pont de Nemours and Company under the trade name of DuPont™ Surlyn® with an average acoustic velocity of 752 m/s, a thickness of 4.6 mil (0.115 mm), and a ratio of maximum to minimum elongation at break for any two given directions of 2.33.

Sheet layer "S4" was a polyethylene (or PE) nonwoven sheet structure flashspun from high-density polyethylene fibers, available from E. I. du Pont de Nemours and Company under the trade name of Tyvek® with an average acoustic velocity of 809 m/s, a thickness of 5.6 mil (0.140 mm) and a ratio of maximum to minimum elongation at break for any two given directions of 1.92.

Sheet layer "S5" was a polytetrafluoroethylene film membrane or sheet structure available from Donaldson Company Inc., Ivyland, Pa. under the trade name of Tetratex® 3101 with an average acoustic velocity of 280 m/s, a thickness of 1.5 mil (0.038 mm), and a ratio of maximum to minimum elongation at break for any two given directions of 6.69.

Sheet layer "S6" was a polyvinyl fluoride (or PVF) film or sheet structure available from E. I. DuPont de Nemours and Company under the trade name of Tedlar® with an average acoustic velocity of 1506 m/s, a thickness of 1.1 mil (0.030 mm), and a ratio of maximum to minimum elongation at break for any two given directions of 1.3.

Example A

Twenty-one layers of fabric layers F1 of about 15"×15" were stitched together by stitches forming a quilted stitch pattern having a stitch spacing of 2 inches (5 cm) and a stitch length of about 0.2 inch (0.5 cm) into an article with an areal density of about 4.14 kg/m². Ballistic tests were conducted using .357 magnum bullets based on the test protocol for NIJ Level II as described in NIJ Standard—0101.04 entitled "Ballistic Resistance of Personal Body Armor". Results of the ballistic tests for two shots, including both V50 and backface deformation, as shown in the Table 2, exhibit backface deformation of 40 and 43 mm and good ballistic V50.

Example B

In this example, a stacked article was made comprising, in order, (a) a first strike section of 10 fabric layers F1 and (b) a body facing section of 10 fabric layers F5. This article is referenced herein as 10F1+10F5. The article was made of about 15 inches by 15 inches (38 cm by 38 cm) of each layer held together with a cross stitch and sewn around the edges. The areal density of the article was about 4.30 kg/m². Ballistic tests were conducted using .357 magnum bullets based on the test protocol for NIJ Level II as described in NIJ Standard—0101.04 entitled "Ballistic Resistance of Personal Body Armor". Results of the ballistic tests of two shots, as shown in the Table 2, showed a backface deformation of 34 and 37 mm.

Example 1

In this example, a stacked article was made comprising, in order, (a) a first strike section of 4 fabric layers F1, (b) a core section comprising a repeating unit of a fabric layer F1 then a sheet layer S1, the unit repeated 11 times, and (c) a body facing section comprising 4 fabric layers F1. This article construction is referenced herein as 4F1+11(F1+S1)+4F1. This stacked article was made of about 15 inches by 15 inches (38 cm by 38 cm) of each layer held together with stitches forming a quilted stitch pattern having a stitch spacing of 2 inches (5 cm) and a stitch length of about 0.2 inch (0.5 cm). The areal density of the article was about 4.04 kg/m². Ballistic tests were conducted using .357 magnum bullets based on the test protocol for NIJ Level II as described in NIJ Standard—0101.04 entitled "Ballistic Resistance of Personal Body Armor". Results of the ballistic tests for two shots, including both V50 and backface deformation, as shown in the Table 2, showed backface deformation values of 32 and 33 mm. The V50 performance is good.

Example 2

In this example, a stacked article was made comprising, in order, (a) a first strike section having 4 fabric layers F2, (b) a core section comprising a repeating unit of a sheet layer S1 then a fabric layer F2, the unit repeated 21 times, and (c) a body facing section having 3 fabric layers F2. This article construction is referenced herein as 4F2+21(S1+F2)+3F2. This stacked article was about 15 inches by 15 inches (38 cm by 38 cm) of each layer held together with stitches forming a quilted stitch pattern having a stitch spacing of 2 inches (5 cm) and a stitch length of about 0.2 inch (0.5 cm). The areal density of the article was about 4.04 kg/m². Ballistic tests were conducted using .357 magnum bullets based on the test protocol for NIJ Level II as described in NIJ Standard—0101.04 entitled "Ballistic Resistance of Personal Body Armor". Results of the ballistic tests for two shots, including both V50 and backface deformation, as shown in the Table 2, exhibit backface deformation values of 32 and 32 mm and good ballistic V50.

Examples 1 and 2 show that structures according to the present invention having an areal density less (better) than the areal density of comparison Example A have substantially less backface deformation than the comparison Example A and the penetration margin of safety, Vo, where the penetration margin of safety is the V50 minus the Vo, is substantially higher than traditionally required in the industry. Traditionally, the penetration margin of safety is 28 m/sec. Examples 1 and 2 show reductions of backface deformation of at least 8 mm over Comparative Example A. Ballistic results also show that Examples 1 and 2, in which all the yarns have been woven and are matrix resin free, compare very favorably with Comparative Example B which is a structure comprising both woven and unidirectional aramid fibers encased in matrix resin.

Example C

Twenty-four layers of fabric layers F1 of about 15"×15" were stitched together by stitches forming a quilted stitch pattern having a stitch spacing of 2 inches (5 cm) and a stitch length of about 0.2 inch (0.5 cm) into an article with an areal density of about 4.73 kg/m$^2$. Ballistic tests were conducted using .44 magnum bullets based on the test protocol for NIJ Level IIIA as described in NIJ Standard—0101.04 entitled "Ballistic Resistance of Personal Body Armor". Four panels were tested for statistic purpose. Results of the ballistic tests of four shots, including both V50 and backface deformation, as shown in the Table 2, exhibited a high backface deformation of about 49.9 mm in average although its ballistic V50 is good.

Example D

In this example, a stacked article was made comprising, in order, (a) a first strike section of 11 fabric layers F1, (b) a core section comprising 15 fabric layers F6, and (c) a body facing section of 4 fabric layers F1. This article is referenced herein as 11F1+15F6+4F1. The article was made of about 15 inches by 15 inches (38 cm by 38 cm) of each layer held together with a cross stitch and sewn around the edges. The areal density of the article was about 5.03 kg/m$^2$. Ballistic tests were conducted using 0.44 magnum bullets based on the test protocol for NIJ Level IIIA as described in NIJ Standard—0101.04 entitled "Ballistic Resistance of Personal Body Armor". Results of the ballistic tests of two shots, including both V50 and backface deformation, as shown in the Table 2, exhibit backface deformation values of 40 and 41 mm while maintaining good ballistic V50.

Example 3

In this example, a stacked article was made comprising, in order, (a) a first strike section having 3 fabric layers F1, (b) a core section comprising a repeating unit of a sheet layer S1 then a fabric layer F1, repeated 17 times, and (c) a body facing section having 3 fabric layers F1. This article construction is referenced herein as 3F1+17(S1+F1)+3F1. This article was made of about 15 inches by 15 inches (38 cm by 38 cm) of each layer held together with stitches forming a quilted stitch pattern having a stitch spacing of 2 inches (5 cm) and a stitch length of about 0.2 inch (0.5 cm). The areal density of the article was about 4.99 kg/m$^2$. Ballistic tests were conducted using .44 magnum bullets based on the test protocol for NIJ Level IIIA as described in NIJ Standard—0101.04 entitled "Ballistic Resistance of Personal Body Armor". Results of the ballistic tests of four shots, including both V50 and backface deformation, as shown in the Table 2, exhibit significant reductions in backface deformation while excellent ballistic V50 was maintained.

Example 4

In this example, a stacked article was made comprising, in order, (a) a first strike section of 6 fabric layers F1, (b) a core section comprising a repeating unit of a sheet layer S4 then a fabric layer F1, the unit repeated 11 times, and (c) a body facing section of 6 fabric layers F1. This article is referenced herein as 6F1+11(S4+F1)+6F1. The article was made of about 15 inches by 15 inches (38 cm by 38 cm) of each layer held together with stitches forming a quilted stitch pattern having a stitch spacing of 2 inches (5 cm) and a stitch length of about 0.2 inch (0.5 cm). The areal density of the article was about 4.98 kg/m$^2$. Ballistic tests were conducted using .44 magnum bullets based on the test protocol for NIJ Level IIIA as described in NIJ Standard—0101.04 entitled "Ballistic Resistance of Personal Body Armor". Results of the ballistic tests of two shots, including both V50 and backface deformation, as shown in the Table 2, exhibit significantly lower backface deformation while maintaining excellent ballistic V50.

Example 5

In this example, a stacked article was made comprising, in order, (a) a first strike section having 5 fabric layers F1, (b) a core section comprising a repeating unit of a sheet layer S6 then a fabric layer F1, repeated 13 times, and (c) a body facing section having 5 fabric layers F1. This article construction is referenced herein as 5F1+13(S6+F1)+5F1. The grade of Tedlar® used in sheet layer S6 was type 1. This article was made of about 15 inches by 15 inches (38 cm by 38 cm) of each layer held together with stitches forming a quilted stitch pattern having a stitch spacing of 2 inches (5 cm) and a stitch length of about 0.2 inch (0.5 cm). The areal density of the article was about 5.13 kg/m$^2$. Ballistic tests were conducted using .44 magnum bullets based on the test protocol for NIJ Level IIIA as described in NIJ Standard—0101.04 entitled "Ballistic Resistance of Personal Body Armor". Results of the ballistic tests of two shots, including both V50 and backface deformation, as shown in the Table 2, exhibit significant reductions in backface deformation while excellent ballistic V50 was maintained.

Inventive Examples 3, 4 and 5 used a 44 magnum projectile and show that structures according to the present invention although of slightly higher areal density had a reduction in back face deformation of about 25% when compared with Comparative Example C which comprised only of woven aramid fabric and are comparable with Example D which comprised both woven aramid fabric and unidirectional polyethylene fiber.

Example E

Forty layers of fabric layers F2 of about 15"×15" were stitched together by a cross-stitch having a stitch length of about 0.2 inch (0.5 cm) and sewn around the edges into an article with an areal density of about 4.96 kg/m$^2$. Ballistic tests were conducted using .44 magnum bullets based on the test protocol for NIJ Level IIIA as described in NIJ Standard—0101.04 entitled "Ballistic Resistance of Personal Body Armor". Results of the ballistic tests of four shots, including both V50 and backface deformation, as shown in the Table 2, exhibited an excessively high backface deformation from 47 to 60 mm although its ballistic V50 is excellent.

Example F

Forty-one layers of fabric layers F2 of about 15"×15" were stitched together by a cross-stitch having a stitch length of about 0.2 inch (0.5 cm) and sewn around the edges into an article with an areal density of about 4.96 kg/m$^2$. Ballistic tests were conducted using .44 magnum bullets based on the test protocol for NIJ Level IIIA as described in NIJ Standard—0101.04 entitled "Ballistic Resistance of Personal Body Armor". Results of the ballistic tests of two shots, including both V50 and backface deformation, as shown in the Table 2, exhibited an excessively high backface deformation of 48 and 54 mm although its ballistic V50 is excellent.

Example G

In this example, a stacked article was made comprising, in order, (a) a first strike section of 4 fabric layers F2, (b) a core section comprising a repeating unit of 2 sheet layers S2 and 1 fabric layer F2, the unit repeated 30 times, and (c) a body facing section of 4 fabric layers of F2. This article construction is referenced herein as 4F2+30(2S2+F2)+4F2. This article was made of about 15 inches by 15 inches (38 cm by 38 cm) with cross stitches having a stitch length of about 0.2 inch (0.5 cm) forming the shape of an X and stitches around edges of the layers. The areal density of the article was about 5.06 kg/m$^2$. Ballistic tests were conducted using .44 magnum bullets based on the test protocol for NIJ Level IIIA as described in NIJ Standard—0101.04 entitled "Ballistic Resistance of Personal Body Armor". Results of the ballistic tests of four shots, including both V50 and backface deformation, as shown in the Table 2, exhibit significantly high backface deformation though it maintains excellent ballistic V50. This shows that although the material of the sheet structure had an acoustic velocity of 1770 m/s, the 0.32 mil thickness of sheet structure between the fabric layers was too low to provide adequate ballistic protection.

Example H

In this example, a stacked article was made comprising, in order, (a) a first strike section of 4 fabric layers F2, (b) a core section comprising a repeating unit of a sheet layer S5 and a fabric layer F2, the unit repeated 29 times, and (c) a body facing section of 4 fabric layers F2. This article construction is referenced herein as 4F2+29(S5+F2)+4F2. This article was made of about 15 inches by 15 inches (38 cm by 38 cm) with cross stitches having a stitch length of about 0.2 inch (0.5 cm) forming the shape of an X and stitches around edges of the layers. The areal density of the article was about 5.07 kg/m$^2$. Ballistic tests were conducted using .44 magnum bullets based on the test protocol for NIJ Level IIIA as described in NIJ Standard—0101.04 entitled "Ballistic Resistance of Personal Body Armor". Results of the ballistic tests of four shots, including both V50 and backface deformation, as shown in the Table 2, exhibit significantly high backface deformation though it maintains excellent ballistic V50. This shows that although the material of the sheet structure had a thickness of 1.5 mil, the acoustic velocity of 280 m/s was too low to provide adequate ballistic protection.

Example 6

In this example, a stacked article was made comprising, in order, (a) a first strike section of 6 fabric layers F2, (b) a core section comprising a repeating unit of a sheet layer S1 then a fabric layer F2, the unit repeated 24 times, and (c) a body facing section of 5 fabric layers of F2. This article construction is referenced herein as 6F2+24(S1+F2)+5F2. This article was made of about 15 inches by 15 inches (38 cm by 38 cm) with each layer held together with stitches forming a quilted stitch pattern having a stitch spacing of 2 inches (5 cm) and a stitch length of about 0.2 inch (0.5 cm). The areal density of the article was about 4.99 kg/m$^2$. Ballistic tests were conducted using .44 magnum bullets based on the test protocol for NIJ Level IIIA as described in NIJ Standard—0101.04 entitled "Ballistic Resistance of Personal Body Armor". Results of the ballistic tests of two shots, including both V50 and backface deformation, as shown in the Table 2, showed a backface deformation of 40 mm while maintaining excellent ballistic V50.

Example 7

In this example, a stacked article was made comprising, in order, (a) a first strike section of 7 fabric layers F2, (b) a core section comprising a repeating unit of a sheet layer S4 then a fiber layer F2, the unit repeated 20 times, and (c) a body facing section of 5 fabric layers F2. This article construction is referenced herein as 7F2+20(S4+F2)+5F2. This article was made of about 15 inches by 15 inches (38 cm by 38 cm) of each layer held together with cross stitches having a stitch length of about 0.2 inch (0.5 cm) forming the shape of an X and stitches around edges of the layers. The areal density of the article was about 5.04 kg/m$^2$. Ballistic tests were conducted using .44 magnum bullets based on the test protocol for NIJ Level IIIA as described in NIJ Standard—0101.04 entitled "Ballistic Resistance of Personal Body Armor". Results of the ballistic tests of two shots, including both V50 and backface deformation, as shown in the Table 2, exhibit backface deformations of 36 and 38 mm while maintaining excellent ballistic V50.

Example 8

In this example, a stacked article was made comprising, in order, (a) a first strike section of 3 fabric layers F2, (b) a core section comprising a repeating unit of a sheet layer S3 and a fabric layer F2, the unit repeated 30 times, and (c) a body facing section of 2 fabric layers F2. This article construction is referenced herein as 3F2+30(S3+F2)+2F2. This article was made of about 15 inches by 15 inches (38 cm by 38 cm) of each layer held together with stitches forming a quilted stitch pattern having a stitch spacing of 2 inches (5 cm) and a stitch length of about 0.2 inch (0.5 cm). The areal density of the article was about 4.97 kg/m$^2$. The weight percent of sheet layers accounted for about 12.7% of the total layers. Ballistic tests were conducted using .44 magnum bullets based on the test protocol for NIJ Level IIIA as described in NIJ Standard—0101.04 entitled "Ballistic Resistance of Personal Body Armor". Results of the ballistic tests of two shots, including both V50 and backface deformation, as shown in the Table 2, exhibit backface deformation of 40 and 41 mm while maintaining excellent ballistic V50.

Example 9

In this example, a stacked article was made of a core section comprising a repeating unit of a sheet layer S1 and a fabric layer F2, the unit repeated 33 times. The end with the exposed sheet layer S1 was the strike face. This article construction is referenced herein as 33(S1+F2). The article was made of about 15 inches by 15 inches (38 cm by 38 cm) with cross stitches having a stitch length of about 0.2 inch (0.5 cm) forming the shape of an X and stitches around edges of the layers. The areal density of the article was about 4.98 kg/m$^2$. The weight percent of the sheet layers S1 accounted for about 17.9% of the total layers. Ballistic tests were conducted using .44 magnum bullets based on the test protocol for NIJ Level IIIA as described in NIJ Standard—0101.04 entitled "Ballistic Resistance of Personal Body Armor". Results of the ballistic tests of two shots, including both V50 and backface deformation, as shown in the Table 2, show backface deformation values of 36 and 39 mm while maintaining excellent ballistic V50.

Example 10

In this example, a stacked article was made of a core section comprising a repeating unit of a fabric layer F2 and a sheet layer S1, the unit repeated 33 times. The end with the exposed fabric layer F2 was the strike face. This article construction is referenced herein as 33(F2+S1). This article was made of about 15 inches by 15 inches (38 cm by 38 cm) with cross stitches having a stitch length of about 0.2 inch (0.5 cm) forming the shape of an X and stitches around edges of the layers. The areal density of the article was about 4.98 kg/m$^2$. The weight percent of sheet layers accounted for about 17.9% of the total layers. Ballistic tests were conducted using .44 magnum bullets based on the test protocol for NIJ Level IIIA as described in NIJ Standard—0101.04 entitled "Ballistic Resistance of Personal Body Armor". Results of the ballistic tests of two shots, including both V50 and backface deformation, as shown in the Table 2, show backface deformation at 40 and 41 mm while maintaining excellent ballistic V50.

Example 11

In this example, a core subsection was made of a repeating unit of a sheet layer S1 and a fabric layer F2, the unit repeated 11 times. This core subsection was made of about 15 inches by 15 inches (38 cm by 38 cm) with cross stitches having a stitch length of about 0.2 inch (0.5 cm) forming the shape of an X through the layers. Three of these core subsections were made and stacked together and sewn around the edges forming a core section. This core section construction is referenced herein as 11(S1+F2)+11(S1+F2)+11(S1+F2). The end face with the exposed sheet layer S1 was the strike face. The areal density of the core section was about 4.98 kg/m$^2$. The weight percent of the sheet layers S1 accounted for about 17.9% of the core section. Ballistic tests were conducted using .44 magnum bullets based on the test protocol for NIJ Level IIIA as described in NIJ Standard—0101.04 entitled "Ballistic Resistance of Personal Body Armor". Results of the ballistic tests of two shots, including both V50 and backface deformation, as shown in the Table 2, gave a backface deformation of 38 mm while maintaining excellent ballistic V50.

Example 12

In this example, a core subsection was made of a repeating unit of a fabric layer F2 and a sheet layer S1, the unit repeated 11 times. This core subsection was made of about 15 inches by 15 inches (38 cm by 38 cm) with cross stitches having a stitch length of about 0.2 inch (0.5 cm) forming the shape of an X through the layers. Three of these core subsections were made and stacked together and sewn around the edges forming a connected core section. This core section construction is referenced herein as 11(F2+S1)+11(F2+S1)+11(F2+S1). The end with the exposed fabric layer F2 was the strike face. The areal density of the core section was about 4.98 kg/m$^2$. The weight percent of sheet layers accounted for about 17.9% of the core section. Ballistic tests were conducted using .44 magnum bullets based on the test protocol for NIJ Level IIIA as described in NIJ Standard—0101.04 entitled "Ballistic Resistance of Personal Body Armor". Results of the ballistic tests of two shots, including both V50 and backface deformation, as shown in the Table 2, gave a backface deformation of 38 mm while maintaining excellent ballistic V50.

Example 13

In this example, a stacked article was made comprising, in order, (a) a first strike section of 3 fabric layers F2, (b) a core section comprising a repeating unit of 2 sheet layers S1 and 1 fabric layer F2, the unit repeated 24 times, and (c) a body facing section of 3 fabric layers F2. This article construction is referenced herein as 3F2+24(2S1+F2)+3F2. This article was made of about 15 inches by 15 inches (38 cm by 38 cm) with each layer held together with cross stitches having a stitch length of about 0.2 inch (0.5 cm) forming the shape of an X and stitches around edges of the layers. The areal density of the article was about 5.02 kg/m$^2$. The weight percent of sheet layers S1 accounted for about 25.8% of the article. Ballistic tests were conducted using .44 magnum bullets based on the test protocol for NIJ Level IIIA as described in NIJ Standard—0101.04 entitled "Ballistic Resistance of Personal Body Armor". Results of the ballistic tests of two shots, including both V50 and backface deformation, as shown in the Table 2, showed backface deformation values of 39 and 40 mm while maintaining excellent ballistic V50.

Examples 6 through 12 are article constructions using similar materials but having different lay-up patterns. All of them have back face deformations between 36 to 40 mm which is 22 to 30 percent lower than the Comparative Examples E and F of similar weight having an all fabric construction. Examples 7 and 8, which have different sheet material compositions than Examples 6 and 9-12, have a similar performance trend to Examples 6 and 9 to 12.

Example I

Thirty-five layers of fabric layers F3 of about 15"×15" were stitched together by a cross-stitch having a stitch length of about 0.2 inch (0.5 cm) and sewn around the edges into a article with an areal density of about 4.83 kg/m$^2$. Ballistic tests were conducted using .44 magnum bullets based on the test protocol for NIJ Level IIIA as described in NIJ Standard—0101.04 entitled "Ballistic Resistance of Personal Body Armor". Results of the ballistic tests from two shots, including both V50 and backface deformation, as shown in the Table 2, exhibited an excessively high backface deformation of 52 & 58 mm although its ballistic V50 is excellent.

Example 14

In this example, a stacked article was made of a core section comprising a repeating unit of a fabric layer F3 and a sheet layer S1, the unit repeated 29 times. The end with the exposed fabric layer F3 was the strike face. This article construction is referenced herein as 29(F3+S1). This article was made of about 15 inches by 15 inches (38 cm by 38 cm) with cross stitches having a stitch length of about 0.2 inch (0.5 cm) forming the shape of an X and stitches around edges of the layers. The areal density of the article was about 4.79 kg/m$^2$. The weight percent of sheet layers S1 accounted for about 16.4% of the article. Ballistic tests were conducted using .44 magnum bullets based on the test protocol for NIJ Level IIIA as described in NIJ Standard—0101.04 entitled "Ballistic Resistance of Personal Body Armor". Results of the ballistic tests of two shots, including both V50 and backface deformation, as shown in the Table 2, exhibit a significant reduction in backface deformation while excellent ballistic V50 performance is maintained.

Example 14 again demonstrates that the inclusion of an appropriate sheet structure in the assembly resulted in a 27 percent reduction in back face deformation when compared with the assembly in Comparison Example I, that did not contain sheet structure layers. In Examples I and 14, the yarn for the fabric layers was polybenzobisoxazole.

Example J

Forty-seven layers of fabric layers F4 of about 15"×15" were stitched together by a cross-stitch having a stitch length of about 0.2 inch (0.5 cm) and sewn around the edges into an article with an areal density of about 5.26 kg/m$^2$. Ballistic tests were conducted using .44 magnum bullets based on the test protocol for NIJ Level IIIA as described in NIJ Standard—0101.04 entitled "Ballistic Resistance of Personal Body Armor". Results of the ballistic tests from two shots, including both V50 and backface deformation, as shown in the Table 2, exhibited a backface deformation of 44 and 45 mm although its ballistic V50 is good.

Example 15

In this example, a stacked article was made comprising, in order, (a) a first strike section of 8 fabric layers F4, (b) a core section comprising a repeating unit of a fabric layer F4 and a sheet layer S1, the unit repeated 25 times, and (c) a body facing section of 8 fabric layers F4. This article construction is referenced herein as 8F4+25(F4+S1)+8F4. This article was made of about 15 inches by 15 inches (38 cm by 38 cm) with cross stitches having a stitch length of about 0.2 inch (0.5 cm) forming the shape of an X and stitches around edges of the layers. The areal density of the article was about 5.27 kg/m$^2$. The weight percent of sheet layers S1 accounted for about 12.8% of the article. Ballistic tests were conducted using .44 magnum bullets based on the test protocol for NIJ Level IIIA as described in NIJ Standard—0101.04 entitled "Ballistic Resistance of Personal Body Armor". Results of the ballistic tests, including both V50 and backface deformation, as shown in the Table 2, exhibit a significant reduction in backface deformation while maintaining excellent ballistic V50 performance.

The back face deformation of Example J is marginally outside specification but inclusion of sheet structure layers in the assembly in Example 15 resulted in a lowering of back face deformation to 40 mm which is well within specification. In Examples I and 14, the yarn for the fabric layers was ultra high molecular weight polyethylene. Examples 14 and 15 show that the invention can be applied to fabric layers woven from high tenacity yarn materials other than aramid.

TABLE I

| Example Number | Article Construction | Fiber Material | Filaments per Yarn | Fiber Linear Density (dtex/filament) | Yarn Linear Density (dtex) | Yarn Tenacity (g/dtex) | Yarn Modulus (g/dtex) | Yarn Elongation to Break (%) | Woven Fabric Ends in Warp and Fill Directions (cm × cm) | Number of Fabric Layers |
|---|---|---|---|---|---|---|---|---|---|---|
| A | 21 layers of PA 930 dtex F1 | para-aramid | 560 | 1.66 | 930 | 24.3 | 676 | 3.4 | 10.2 × 10.2 | 21 |
| B | 10F1 + 10F5 where F1 is PA930 dtex fabric and F5 is aramid UD + thermoplastic film | para-aramid | 560 | 1.66 | 930 (F1) | 24.3 | 676 | 3.4 | 10.2 × 10.2 (F1) | 10 (F1) 10 (F5) |
| 1 | 4F1 + 11(F1 + S1) + 4F1 where F1 is PA930 dtex fabric and S1 is PET 0.019 mm film | para-aramid | 560 | 1.66 | 930 | 24.3 | 676 | 3.4 | 10.2 × 10.2 | 19 |
| 2 | 4F2 + 21(S1 + F2) + 3F2 where F2 is PA 660 dtex fabric and S1 is PET 0.019 mm film | para-aramid | 400 | 1.66 | 660 | 25.7 | 703 | 3.4 | 9.1 × 9.1 | 29 |
| C | 24 layers of PA 930 dtex F1 | para-aramid | 560 | 1.66 | 930 | 24.3 | 676 | 3.4 | 10.2 × 10.2 | 24 |
| D | 11F1 + 15F6 + 4F1 where F1 is PA930 dtex fabric and F6 is PE UD + thermoplastic film | para-aramid (F1) polyethylene (F6) | 560 | 1.66 | 930 (F1) | 24.3 | 676 | 3.4 | 10.2 × 10.2 (F1) | 15 (F1) 15 (F6) |
| 3 | 3F1 + 17(S1 + F1) + 3F1 where F1 is PA930 dtex fabric and S1 is PET 0.019 mm film | para-aramid | 560 | 1.66 | 930 | 24.3 | 676 | 3.4 | 10.2 × 10.2 | 23 |
| 4 | 6F1 + 11(S4 + F1) + 6F1 where F1 is PA930 dtex fabric and S4 is PE nonwoven fiber sheet | para-aramid | 560 | 1.66 | 930 | 24.3 | 676 | 3.4 | 10.2 × 10.2 | 23 |
| 5 | 5F1 + 13(S6 + F1) + 5F1 where F1 is PA930 dtex fabric and S6 is PVF 0.030 mm film | para-aramid | 560 | 1.66 | 930 | 24.3 | 676 | 3.4 | 10.2 × 10.2 | 23 |
| E | 40 layers of PA 660 dtex F2 | para-aramid | 400 | 1.66 | 660 | 25.7 | 703 | 3.4 | 9.1 × 9.1 | 40 |
| F | 41 layers of PA 660 dtex F2 | para-aramid | 400 | 1.66 | 660 | 25.7 | 703 | 3.4 | 9.1 × 9.1 | 41 |
| G | 4F2 + 30(2S2 + F2) + 4F2 where F2 is PA 660 dtex fabric and S2 is PET 0.004 mm film | para-aramid | 400 | 1.66 | 660 | 25.7 | 703 | 3.4 | 9.1 × 9.1 | 38 |

TABLE I-continued

| Example Number | Article Construction | Fiber Material | Filaments per Yarn | Fiber Linear Density (dtex/filament) | Yarn Linear Density (dtex) | Yarn Tenacy (g/dtex) | Yarn Modulus (g/dtex) | Yarn Elongation to Break (%) | Woven Fabric Ends in Warp and Fill Directions (cm × cm) | Number of Fabric Layers |
|---|---|---|---|---|---|---|---|---|---|---|
| H | 4F2 + 29(S5 + F2) + 4F2 where F2 is PA 660 dtex fabric and S5 is PTFE film | para-aramid | 400 | 1.66 | 660 | 25.7 | 703 | 3.4 | 9.1 × 9.1 | 37 |
| 6 | 6F2 + 24(S1 + F2) + 5F2 where F2 is PA 660 dtex fabric and S1 is PET 0.019 mm film | para-aramid | 400 | 1.66 | 660 | 25.7 | 703 | 3.4 | 9.1 × 9.1 | 35 |
| 7 | 7F2 + 20(S4 + F2) + 5F2 where F2 is PA 660 dtex fabric and S4 is PE film | para-aramid | 400 | 1.66 | 660 | 25.7 | 703 | 3.4 | 9.1 × 9.1 | 32 |
| 8 | 3F2 + 30(S3 + F2) + 2F2 where F2 is PA 660 dtex fabric and S3 is E/MAA film | para-aramid | 400 | 1.66 | 660 | 25.7 | 703 | 3.4 | 9.1 × 9.1 | 35 |
| 9 | 33(S1 + F2) where F2 is PA 660 dtex fabric and S1 is PET 0.019 mm film | para-aramid | 400 | 1.66 | 660 | 25.7 | 703 | 3.4 | 9.1 × 9.1 | 33 |
| 10 | 33(F2 + S1) where F2 is PA 660 dtex fabric and S1 is PET 0.019 mm film | para-aramid | 400 | 1.66 | 660 | 25.7 | 703 | 3.4 | 9.1 × 9.1 | 33 |
| 11 | 11(S1 + F2) + 11(S1 + F2) + 11(S1 + F2) where F2 is PA 660 dtex fabric and S1 is PET 0.019 mm film | para-aramid | 400 | 1.66 | 660 | 25.7 | 703 | 3.4 | 9.1 × 9.1 | 33 |
| 12 | 11(F2 + S1) + 11(F2 + S1) + 11(F2 + S1) where F2 is PA 660 dtex fabric and S1 is PET 0.019 mm film | para-aramid | 400 | 1.66 | 660 | 25.7 | 703 | 3.4 | 9.1 × 9.1 | 33 |
| 13 | 3F2 + 24(2S1 + F2) + 3F2 where F2 is PA 660 dtex fabric and S1 is PET 0.019 mm film | para-aramid | 400 | 1.66 | 660 | 25.7 | 703 | 3.4 | 9.1 × 9.1 | 30 |
| I | 35 layers of PBO F3 | PBO | 333 | 1.66 | 550 | 37.8 | 1200 | 3.5 | 11.8 × 11.8 | 35 |
| 14 | 29(F3 + S1) where F3 is PBO fabric and S1 is PET 0.019 mm film | PBO | 333 | 1.66 | 550 | 37.8 | 1200 | 3.5 | 11.8 × 11.8 | 29 |
| J | 47 layers of UHMWPE F4 | UHMWPE | 60 | 4.00 | 239 | 34.2 | 1190 | 2.9 | 21.7 × 21.7 | 47 |
| 15 | 8F4 + 25(F4 + S1) + 8F4 where F4 is UHMWPE woven fabric and S1 is PET 0.019 mm film | UHMWPE | 60 | 4.00 | 239 | 34.2 | 1190 | 2.9 | 21.7 × 21.7 | 41 |

TABLE 2

| Example Number | Article Construction | Sheet Layer Material | Number of Sheet Layers | Single Sheet Layer Thickness (mm) | Accoustic Velocity Ratio of each Sheet Layer (m/s) | Number of Repeating Sections | Article Areal Density (kg/m$^2$) | Bullet Type | Backface Deformation (mm) at 436 +/− 10 m/sec | V50 (m/s) | Vo Penetration Margin of Safety (T or V50-436) (m/s) | Wgt. % of Sheet Layers (%) |
|---|---|---|---|---|---|---|---|---|---|---|---|---|
| A | 21 layers of PA 930 dtex F1 | NA | 0 | NA | NA | NA | 4.14 | .357 mag | 40; 43 | 495 | 59 | 0 |
| B | 10F1 + 10F5 where F1 is PA930 dtex fabric and F5 is aramid UD + thermoplastic film | NA | 0 | NA | NA | NA | 4.3 | .357 mag | 34; 37 | 488 | 52 | 0 |
| 1 | 4F1 + 11(F1 + S1) + 4F1 where F1 is PA930 dtex fabric and S1 is PET 0.019 mm film | PET | 11 | 0.019 | 2,045 | 11 | 4.04 | .357 mag | 32; 33 | 473 | 37 | 7.4 |
| 2 | 4F2 + 21(S1 + F2) + 3F2 where F2 is PA 660 dtex fabric and S1 is PET 0.019 mm film | PET | 21 | 0.019 | 2,045 | 21 | 4.04 | .357 mag | 32; 32 | 480 | 44 | 14.0 |
| C | 24 layers of PA 930 dtex F1 | NA | 0 | NA | NA | NA | 4.73 | .44 mag | 48; 61; 50; 51; 44; 55; | 477 | 41 | 0 |

TABLE 2-continued

| Example Number | Article Construction | Sheet Layer Material | Number of Sheet Layers | Single Sheet Layer Thickness (mm) | Accoustic Velocity Ratio of each Sheet Layer (m/s) | Number of Repeating Sections | Article Areal Density (kg/m$^2$) | Bullet Type | Backface Deformation (mm) at 436 +/− 10 m/sec | V50 (m/s) | Vo Penetration Margin of Safety (T or V50-436) (m/s) | Wgt. % of Sheet Layers (%) |
|---|---|---|---|---|---|---|---|---|---|---|---|---|
| D | 11F1 + 15F6 + 4F1 where F1 is PA930 dtex fabric and F6 is PE UD + thermoplastic film | NA | 0 | NA | NA | NA | 5.03 | .44 mag | 41; 49 40; 41 | 503 | 67 | 0 |
| 3 | 3F1 + 17(S1 + F1) + 3F1 where F1 is PA930 dtex fabric and S1 is PET 0.019 mm film | PET | 17 | 0.019 | 2,045 | 17 | 4.99 | .44 mag | 38 | 506 | 70 | 9.2 |
| 4 | 6F1 + 11(S4 + F1) + 6F1 where F1 is PA930 dtex fabric and S4 is PE nonwoven fiber sheet | PE | 11 | 0.140 | 809 | 11 | 4.98 | .44 mag | 39; 41 | 494 | 58 | 9.1 |
| 5 | 5F1 + 13(S6 + F1) + 5F1 where F1 is PA930 dtex fabric and S6 is PVF 0.030 mm film | PVF | 13 | 0.030 | 1506 | 13 | 4.88 | .44 mag | 35; 34; 33; 34 | 486 | 50 | 7.4 |
| E | 40 layers of PA 660 dtex F2 | NA | 0 | NA | NA | NA | 4.96 | .44 mag | 57; 53; 47; 60; | 512 | 76 | 0 |
| F | 41 layers of PA 660 dtex F2 | NA | 0 | NA | NA | NA | 5.08 | .44 mag | 48; 54 | 533 | 97 | 0 |
| G | 4F2 + 30(S2 + F2) + 4F2 where F2 is PA 660 dtex fabric and S2 is PET 0.004 mm film | PET | 60 | 0.004 | 1770 | 30 | 5.06 | .44 mag | 51; 50; 49; 52; | 518 | 82 | 6.9 |
| H | 4F2 + 29(S5 + F2) + 4F2 where F2 is PA 660 dtex fabric and S5 is PTFE film | PTFE | 29 | 0.038 | 280 | 29 | 5.07 | .44 mag | 49; 55; 56; 58; | 516 | 80 | 9.4 |
| 6 | 6F2 + 24(S1 + F2) + 5F2 where F2 is PA 660 dtex fabric and S1 is PET 0.019 mm film | PET | 24 | 0.019 | 2,045 | 24 | 4.99 | .44 mag | 40; 40 | 541 | 105 | 19.7 |
| 7 | 7F2 + 20(S4 + F2) + 5F2 where F2 is PA 660 dtex fabric and S4 is PE film | PE | 20 | 0.140 | 809 | 20 | 5.04 | .44 mag | 36; 38 | 520 | 84 | 16.3 |
| 8 | 3F2 + 30(S3 + F2) + 2F2 where F2 is PA 660 dtex fabric and S3 is E/MAA film | E/MAA | 30 | 0.115 | 752 | 30 | 4.97 | .44 mag | 40; 41 | 478 | 42 | 12.7 |
| 9 | 33(S1 + F2) where F2 is PA 660 dtex fabric and S1 is PET 0.019 mm film | PET | 33 | 0.019 | 2,045 | 33 | 4.98 | .44 mag | 36; 39 | 503 | 67 | 17.9 |
| 10 | 33(F2 + S1) where F2 is PA 660 dtex fabric and S1 is PET 0.019 mm film | PET | 33 | 0.019 | 2,045 | 33 | 4.98 | .44 mag | 40; 41 | 493 | 57 | 17.9 |
| 11 | 11(S1 + F2) + 11 (S1 + F2) + 11 (S1 + F2) where F2 is PA 660 dtex fabric and S1 is PET 0.019 | PET | 33 | 0.019 | 2,045 | 33 | 4.98 | .44 mag | 38; 38 | 496 | 60 | 17.9 |

TABLE 2-continued

| Example Number | Article Construction | Sheet Layer Material | Number of Sheet Layers | Single Sheet Layer Thickness (mm) | Accoustic Velocity Ratio of each Sheet Layer (m/s) | Number of Repeating Sections | Article Areal Density (kg/m²) | Bullet Type | Backface Deformation (mm) at 436 +/- 10 m/sec | V50 (m/s) | Vo Penetration Margin of Safety (T or V50-436) (m/s) | Wgt. % of Sheet Layers (%) |
|---|---|---|---|---|---|---|---|---|---|---|---|---|
| 12 | 11(F2 + S1) + 11 (F2 + S1) + 11 (F2 + S1) where F2 is PA 660 dtex fabric and S1 is PET 0.019 mm film | PET | 33 | 0.019 | 2,045 | 33 | 4.98 | .44 mag | 38; 38 | 495 | 59 | 17.9 |
| 13 | 3F2 + 24(2S1 + F2) + 3F2 where F2 is PA 660 dtex fabric and S1 is PET 0.019 mm film | PET | 48 | 0.019 | 2,045 | 24 | 5.02 | .44 mag | 39; 40 | 480 | 44 | 25.8 |
| I | 35 layers of PBO F3 | NA | 0 | NA | NA | NA | 4.83 | .44 mag | 52; 58 | 533 | 97 | 0 |
| 14 | 29(F3 + S1) where F3 is PBO fabric and S1 is PET 0.019 mm film | PET | 29 | 0.019 | 2,045 | 29 | 4.79 | .44 mag | 36; 44 | 528 | 92 | 16.4 |
| J | 47 layers of UHMWPE F4 | NA | 0 | NA | NA | NA | 5.26 | .44 mag | 44; 45 | 480 | 44 | 0 |
| 15 | 8F4 + 25(F4 + S1) + 8F4 where F4 is UHMWPE woven fabric and S1 is PET 0.019 mm film | PET | 25 | 0.019 | 2,045 | 25 | 5.27 | .44 mag | 38; 41 | 471 | 35 | 12.8 |

What is claimed is:

1. A body armor article for resisting ballistic objects, comprising:
a plurality of woven fabric layers woven from yarns having a tenacity of at least 7.3 grams per dtex and a modulus of at least 100 grams per dtex;
a plurality of sheet layers comprising non-woven random oriented fibrous sheets and/or non fibrous films, each of the sheet layers having a thickness of at least 0.013 mm;
the woven fabric layers and the sheet layers stacked together comprising a first core section which includes at least two repeating units of, in order, at least one of the woven fabric layers then at least one of the sheet layers; wherein
i. the sheet layers comprise 0.5 to 30 wt % of the total weight of the article;
ii. each of the sheet layers has an average acoustic velocity at least 600 m/sec;
iii. the sheet layers are isotropic or substantially isotropic;
iv. the woven fabric layers and the sheet layers are attached together at 10% or less of their surface areas.

2. The article of claim 1, wherein the yarns have linear density of 50 to 4500 dtex, a tenacity of 10 to 65 g/dtex, a modulus of 150 to 2700 g/dtex, and an elongation to break of 1 to 8 percent.

3. The article of claim 1, wherein the yarns are made of filaments made from a polymer selected from the group consisting of polyamides, polyolefins, polyazoles, and mixtures thereof.

4. The article of claim 1, wherein the woven fabric sheets are not encased or coated with a matrix resin.

5. The article of claim 1, wherein each of the sheet layers have a thickness of no more than 0.152 mm.

6. The article of claim 1, wherein the sheet layers are made of materials selected from the group consisting of polycondensation products of dicarboxylic acids with dihydroxyalcohols, ionomers, thermoplastic fluoropolymers, polyolefins, polyimides, and mixtures thereof.

7. The article of claim 1, wherein each of the sheet layers has a ratio of maximum strain to failure value to minimum strain to failure value of 1 to 5.

8. The article of claim 1, wherein the core section includes 3 to 60 of the woven fabric layers and 3 to 60 of the sheet layers.

9. The article of claim 1, wherein there are 3 to 50 of the repeating units.

10. The article of claim 1, wherein the core section has a first strike end surface and a body facing end surface; and the article further comprising a first strike section and an body facing section, the first strike section comprising a plurality of the woven fabric layers stacked together and stacked on the first strike end surface of the core section, and the body facing section comprising a plurality of the woven fabric layers stacked together and stacked on the body facing surface of the core section.

11. The article of claim 10, wherein the first strike section has 2 to 30 woven fabric layers stacked together and the body facing section has 2 to 30 woven fabric layers stacked together.

12. The article of claim 1, wherein the core section has a woven fabric end surface and a sheet end surface, further comprising at least one of the woven fabric layers stacked on the sheet end surface of the core section.

13. The article of claim 1, wherein the core section comprises a plurality of core subsections, each core subsection with a repeating unit.

14. The article of claim 1, wherein the article has a backface deformation of less than or equal to 44 mm at a projectile velocity ($V_o$) of 1430 ft/sec plus or minus 30 ft/sec (436 m/sec plus or minus 9 m/sec) in accordance with NIJ Standard—0101.04 "Ballistic Resistance of Personal Body Armor", issued in September 2000.

15. The article of claim 1, wherein the woven fabric layers and the sheet layers are only attached together at 10% or less of their surface areas allowing all or most of the remainder of the layers to move laterally and/or separate with respect to adjacent layers.

16. The article of claim 1, wherein the woven fabric layers and the sheet layers, stacked together, have an areal density of 2.5 to 5.7 kg/m$^2$.

* * * * *